PERIODICALLY SELF-TRIGGERING TUNNEL DIODE CURRENT DISCRIMINATOR
Filed Feb. 5, 1965
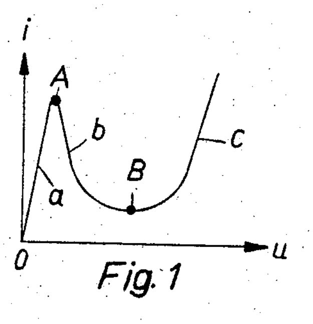
Fig. 1
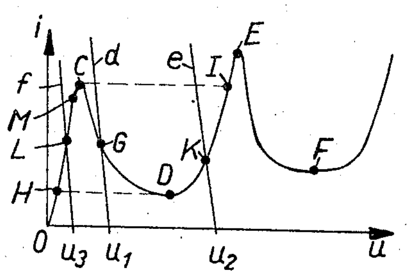
Fig. 2
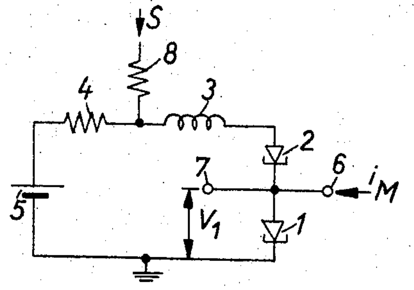
Fig. 3
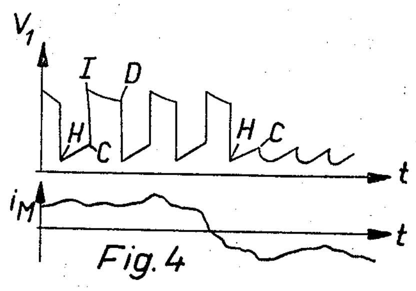
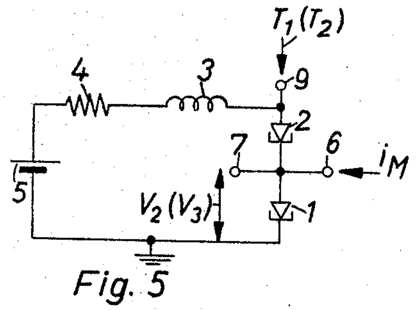
Fig. 5
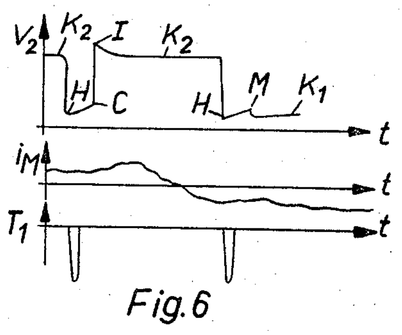
Fig. 6
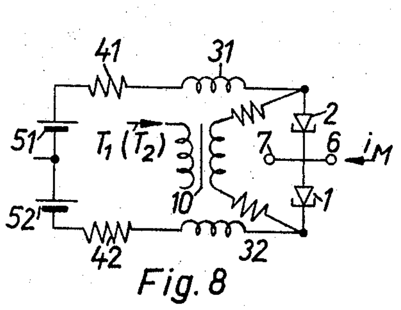
Fig. 8
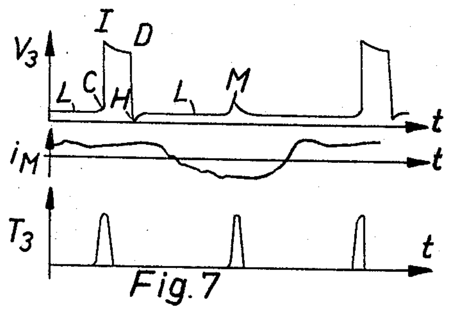
Fig. 7
Inventor:
WERNER BLEICKARDT
BY Rupert J. Brady
ATTORNEY

United States Patent Office 3,349,253
Patented Oct. 24, 1967

3,349,253

PERIODICALLY SELF-TRIGGERING TUNNEL DIODE CURRENT DISCRIMINATOR

Werner Bleickardt, Bern, Switzerland, assignor to Hasler, AG, Bern, Switzerland, a corporation of Switzerland Filed Feb. 5, 1965, Ser. No. 430,708
Claims priority, application Switzerland, Feb. 7, 1964, 1,433/64
1 Claim. (Cl. 307—88.5)

ABSTRACT OF THE DISCLOSURE

The periodically self-triggering current discriminator includes a series connection of two tunnel diodes, a self induction coil, a resistor and a direct current source providing a negative resistance oscillator circuit. Depending on the polarity or intensity of a low current supplied to the connection between the two tunnel diodes one or the other tunnel diode changes periodically between a high or low voltage state while said other or said one tunnel diode, respectively, remains in its low voltage state.

This invention relates to an electronic discriminator circuit for the distinction of input current values above and below a predetermined limit valve. This discriminator has an input, an output, and a trigger circuit.

The object of the invention is to provide a discriminator circuit for distinguishing between currents or different levels, which can distinguish within a very short time, e.g. in fractions of a microsecond, whether a very weak input current value is above or below a certain predetermined limit value. In addition to many different possible limit levels or values, the limit value may be zero, in which case the discriminator distinguishes between the directions of the input current. It is, therefore, another object of the invention to provide a circuit which discriminates between polarities of the input signal.

The discriminator is largely independent of temperature influences, aging of its structural elements, and fluctuations in its operating voltages, according to other objects of the invention.

According to the invention, the input and output terminals of the circuit are connected to the interconnected poles of two tunnel diodes with the same polarity connected in series.

These tunnel diodes are connected in series with at least one self-induction coil, at least one resistance, and a direct current source, to form a closed circuit. The trigger circuit contains the two tunnel diodes. The voltage of the direct current source and the resistance are so rated that the current-voltage characteristics of the series connection of the tunnel diodes and the straight line which represents the voltage of the current source reduced by the voltage drop at the resistance have a single intersection.

It has been found that the self-induction coil leads to a substantial increase of the speed of response of the discriminator.

The invention is set forth more fully in several embodiments in the specification hereinafter following by reference to the accompanying drawings, in which:

FIG. 1 is a graphic plot showing the current-voltage characteristic of a tunnel diode;

FIG. 2 is a graphic slot showing the current-voltage characteristic of a series connection of two tunnel diodes of equal polarity;

FIG. 3 is an electrical schematic diagram of a first form of construction of the discriminator of the invention;

FIG. 4 consists of graphic plots of input current and output voltage relative to time, showing the operation of the discriminator according to FIG. 3;

FIG. 5 is an electrical schematic diagram of a second form of construction of the discriminator circuit of the invention;

FIG. 6 illustrates plots of input current, input trigger pulses, and output voltage relative to time, showing the operation of the discriminator according to FIG. 5 in a first mode of operation;

FIG. 7 consists of graphic plots similar to FIG. 6, but showing the operation of the discriminator according to FIG. 5 in a second mode of operation; and FIG. 8 is an electrical schematic diagram of a modified form of the discriminator of FIG. 5.

As shown by the current-voltage characteristic plot of a tunnel diode in FIG. 1, first the input $i$ increases at increasing voltage $u$ during an ascending curve section $a$ to a maximum at point A, then it decreases along a descending curve section $b$ to a minimum B, and then it increases along a curve section $c$.

If two tunnel diodes with coinciding polarity are connected in series, that is, the anode of one tunnel diode being connected with the cathode of the other, one obtains the current-voltage characteristic curve for this series connection shown in FIG. 2. This characteristic curve has a first maximum current at point C, a first minimum current at point D, a second maximum current at point E, and a second minimum current at point F. The working point of each of the two tunnel diodes in the curve section $a$ of FIG. 1, is located in the curve section OC of the plot of FIG. 2, and in the curve section rising from point F in FIG. 2 with increasing voltage, is located the working point of each individual tunnel diode in the curve section $c$ of its characteristic curve of FIG. 1. The curve section CDEF in FIG. 2 is equivocal. For example, between points D and E there may be located either the working point of the first diode in the curve section $a$ and the working point of the second diode in the curve section $c$ of their characteristic according to FIG. 1, or conversely the working point of the first tunnel diode may be located in curve section $c$ and that of the second tunnel diode in curve section $a$. Point M located on the curve section OC, in FIG. 2, just below point C, will be referred to later in the specification. For the examples described hereinafter following it is assumed that both tunnel diodes have practically identical operating characteristics.

In the discriminator circuit of the invention, according to FIG. 3, two tunnel diodes 1 and 2, which are connected in series with identical polarity, form together with a self-induction coil 3, a resistance 4, and a direct current source 5, a closed circuit. The opposite end of the series connected diodes and the direct current source are connected to ground. An input 6 and an output 7 are connected to the directly interconnected poles of the tunnel diodes 1 and 2. The voltage of the current source 5 is designated by $u_1$ in FIG. 2. The straight line d in the plot of FIG. 2 represents the voltage of current source 5 reduced by the voltage drop at the resistance 4. The voltage $u_1$ of the current source 5 and the resistance 4 are rated so that the current-voltage characteristic of the series connection of the tunnel diodes 1 and 2 and the straight line $d$ have a single intersection at point G, located in the descending curve section CD between the first maximum and the first minimum current points of the characteristic curve. Under these conditions the resistance 4 is smaller than the negative resistance of the series connection of the tunnel diodes 1 and 2 at point G, and the circuit 1, 2, 3, 4, 5 excites itself and generates a trigger current, whose frequency is determined essentially by the coil 3. The working point then passes through a close cycle DHCID. This cycle runs through the equivocal characteristic curve section ID. It then depends on the direction or polarity of the current $i_M$, supplied to the input 6, whether in the curve section ID of the tunnel diode 1 operates in section $a$ and the tunnel diode 2 in section $c$, or conversely the tunnel diode 2 operates in section *a* and the tunnel diode 1 in section *c* of their characteristic curve according to FIG. 1. Since smaller voltages are assigned to curve section *a* than to curve section *c*, the potential course $V_1$ at the output 7 depends on the direction of the input current $i_M$. FIG. 4 in the upper graphic plot shows the course of the output potential $V_1$ relative to time for the illustrated course of the input current $i_M$ relative to time shown in the lower graphic plot, whose direction is to be determined. In FIG. 4 some points on the upper curve, in which the working point is located at the respective times *t*, are designated by the same letters as the corresponding points of the characteristic curve in FIG. 2. According to the ambiguity of the curve section ID in FIG. 2, the output potential $V_1$, during passage of this curve section, is higher or lower depending on whether the tunnel diode 1 works in the curve section *c* or in the curve section *a* of FIG. 1. The former is the case when the current supplied to input terminal 6 is positive, the latter, when it is negative. Here a very weak current $i_M$ sufficies, for example, of 10 microampere. The frequency of the self-exicited trigger current can be synchronized by synchronizing input current S, which is supplied to the circuit at the connection between coil 3 and resistance 4 through resistance 8, and which may be approximately equal to the frequency of the trigger current or to a whole multiple thereof.

The circuit arrangement of the second form of the discriminator of the invention, according to FIG. 5, differs from the circuit shown in FIG. 3 in that it does not itself generate the trigger current but has a terminal 9 for receiving an outside input trigger current. This terminal 9 is coupled with the connection between the tunnel diode 2 and coil 3.

In the following, two different layouts of the discriminator circuit arrangement of FIG. 5 are described, using different circuit parameters, and having respectively different modes of operation.

With regard to the circuit parameters of the first layout, according to FIG. 5, the voltage $u_2$ of the current source 5 and the resistance 4 are so rated that the straight line *e*, in FIG. 2, which represents the voltage of the current source 5 reduced by the voltage drop at the resistance 4, intersects the current-voltage characteristic curve of the series connection of the two tunnel diodes 1 and 2 at a point K, located in the ascending curve section between the first current minimum D and the second current maximum E. As the resistance of the circuit 1, 2, 3, 4, 5 is positive at point K, self-excitation does not occur. The circuit is fed by negative input trigger current pulses $T_1$ at input terminal 9. Each of these input pulses causes the working point to describe a cycle KDHCIK, that is, each input pulse triggers the circuit through the mentioned operating cycle. In the neutral state the working point K lies on the equivocal curve section ED of the characteristic curve, and when the cycle is run through, it depends on the direction of the current $i_M$ whether at the end of the cycle the diode 1 operated in curve section *a* or in curve section *c* of FIG. 1. For the rest, the circuit operation corresponds to that described in connection with FIG. 3. FIG. 6 shows, in a manner corresponding to FIG. 4 the course of the output potential $V_2$ relative to time in the upper plot as a function of the current $i_M$ in the middle plot, supplied at a given input trigger current $T_1$, shown in the lower plot. According to the ambiguity of point K (at which does not appear in FIG. 2, but which according to FIG. 6 leads to different output potentials), there are introduced in FIG. 6 two reference symbols $K_1$ and $K_2$ for the equivocal designation K, index 1 indicating that the tunnel diode 1 operates in curve section *a* and tunnel diode 2 in curve section *c* of FIG. 1, while index 2 indicates that tunnel diode 1 operates in curve section *c* and tunnel diode 2 in curve section *a* of FIG. 1.

In another layout of the circuit according to FIG. 5 with different circuit parameters to give a different mode of operation, the voltage $u_3$ of current source 5 and the resistance are rated so that the straight line *f* (FIG. 2), which represents the voltage $u_3$ of current source 5 reduced by the voltage drop at resistance 4, intersects the current-voltage characteristic curve of the series connection of the diodes 1 and 2 at point L, located between the coordinate origin O and the first maximum current point C of the characteristic. The circuit for this mode of operation is fed by positive trigger current pulses $T_2$ introduced on the input terminal 9. At each of these pulses the working point of the circuit describes a cycle LCIKDHL. In contrast to the operation of the circuit described in connection with FIG. 6, where the working point is located at the end of each cycle on the equivocal curve section DI of the characteristic, in this form of construction it is located at the end of each cycle on the unequivocal curve section OC and ony temporarily during the cycle on the equivocal curve section ED. In this layout, it is not the output potential in the intervals of time between the output pulses $V_3$ by the height of the output pulses that depends on whether the input current $i_M$ supplied to the input terminal 6, and whose direction is to be determined, is positive or negative. The diagram in FIG. 7 shows in a manner of representation and designation corresponding to FIGS. 4 and 6 the course or plot of the output potential $V_3$, dependent on the direction of the input current $i_M$ at given trigger current pulses $T_3$, where each plot is based on time *t*.

The duration of the pulses $V_2$, $V_3$ depends on the self-induction of coil 3.

The elements of the circuits according to FIGS. 3 and 4 may, for example, consist of the following components: Tunnel diodes 1 and 2 Type 1 N 2940 (current at point A of FIG. 1: 1 milliampere), self-induction of coil 3: 6 to 12 microhenry, duration of the pulses $V_2$, $V_3$ or half period duration of the pulses $V_1$: 50 to 100 nanoseconds (1 nanosecond$=10^{-9}$ second).

FIG. 8 shows a symmetrical form of construction in a modified form of the circuit according to FIG. 5. In this symmetrical form of construction the self-induction coil 3, the resistance 4, and the current source 5 are each subdivided into two symmetrically arranged halves 31, 32; 41, 42; 51, 52; respectively, and the trigger current $T_1$, $T_2$ is connected through a transformer 10 to the poles of the tunnel diodes 1 and 2 which are not commonly connected.

In the above examples it has been assumed for the sake of simplification that the predetermined limit value about which the circuit operates is zero, that is, the set level about which the currents of different direction or polarity are to be distinguished or discriminated. Naturally, the limit value may also be a current value other than zero, the distinction being made whether the current exceeds or falls short of this predetermined value set in the circuit. The limit value corresponds to the difference of the currents of the tunnel diodes at point *a* of their characteristics according to FIG. 1.

While the discriminator circuit of the invention has been shown and described in certain preferred embodiments it is realized that modifications can be made without departing from the spirit of the invention, and it is to be understood that no limitations on the invention are intended other than those imposed by the scope of the appended claim.

What I claim as new and desire to secure by Letters Patent of the United States, is as follows:

A discriminator circuit for the distinction of input current values above and below a predetermined value comprising, an input; an output; a trigger circuit; a pair of tunnel diodes connected in series and having the same polarity; said input and said output connected to the connection between said pair of tunnel diodes; self-induction coil means; a resistance element; a direct current source connected in a closed series circuit with said resistance element, said self-induction coil means and said pair of tunnel diodes; said trigger circuit containing said pair of tunnel diodes; and the voltage of said direct current source and said resistance element being so rated that the straight line representing the voltage of the direct current source reduced by the voltage drop at said resistance element has a single intersection with the current-voltage characteristic curve of the series connected tunnel diodes lying in the descending curve section between the first maximum current peak and the first minimum current point.

References Cited

UNITED STATES PATENTS 3,187,194 6/1965 Habayeb ------------ 307—88

ARTHUR GAUSS, *Primary Examiner.*

J. BUSCH, R. PLOTKIN, *Assistant Examiners.*